United States Patent [19]

Eichenauer et al.

[11] Patent Number: 4,801,632

[45] Date of Patent: Jan. 31, 1989

[54] CELLULOSE ESTER MOULDING MATERIALS WITH IMPROVED TOUGHNESS

[75] Inventors: Herbert Eichenauer, Dormagen; Christian Lindner, Cologne; Friedemann Müller, Neuss; Hartwig Höcker, Eckersdorf; Helmut Keul, Karlsruhe, all of Fed. Rep. of Germany

[73] Assignee: Bayer Akteingesellschaft, Leverkusen, Fed. Rep. of Germany

[21] Appl. No.: 17,878

[22] Filed: Feb. 24, 1987

[30] Foreign Application Priority Data

Mar. 7, 1986 [DE] Fed. Rep. of Germany ....... 3607626

[51] Int. Cl.$^4$ ............................ C08L 1/14; C08L 1/10; C08L 83/10; C08K 5/10
[52] U.S. Cl. ........................................ 524/37; 524/38; 524/39; 524/40; 524/41
[58] Field of Search ...................... 524/37, 38, 39, 40, 524/41

[56] References Cited

U.S. PATENT DOCUMENTS

| | | | |
|---|---|---|---|
| 3,511,699 | 5/1970 | Johnson et al. | 117/135.5 |
| 3,691,257 | 9/1972 | Kendrick et al. | 524/41 |
| 4,094,695 | 6/1978 | Sanders | 106/179 |
| 4,151,498 | 7/1979 | Bopp | 525/439 |
| 4,357,267 | 11/1982 | Alberts et al. | 524/41 |
| 4,428,776 | 1/1984 | Li | 524/41 |

FOREIGN PATENT DOCUMENTS 0471839 6/1969 Switzerland .
0648576 2/1979 U.S.S.R. .................. 524/40

*Primary Examiner*—Maurice J. Welsh
*Assistant Examiner*—Nathan M. Nutter
*Attorney, Agent, or Firm*—Connolly & Hutz

[57] ABSTRACT

Thermoplastic moulding materials consisting of
(1) 70 to 99.9% by weight of a cellulose ester or cellulose mixed ester
(2) 0.1 to 30% by weight of a rubber polymer built up in the form of blocks from recurring structural units (I) with molecular weights of 10,000 to 1,000,000

$$+A-B+\qquad\qquad I$$

wherein
A denotes bifunctional polysiloxane segments of the formula $$+(R^1)(R^2)SiO+_x\qquad\qquad II$$

in which
$R^1$ and $R^2$ = aryl (in particular phenyl) or alkyl (in particular methyl) and
x is a number such that the molecular weight is $\geq 500$, and
B denotes bifunctional aliphatic polyester and/or aliphatic polyester segments with molecular weights of $\geq 800$,
and the glass transition temperatures of the polymeric blocks A and B are less than 20° C., which contains additionally
(3) 0 to 30% by weight based on the mixture of (1) and (2) of a plasticizer.

4 Claims, No Drawings

CELLULOSE ESTER MOULDING MATERIALS WITH IMPROVED TOUGHNESS

The invention relates to thermoplastic moulding materials of cellulose esters or cellulose mixed esters and block copolymers with recurring structural units from the series comprising polysiloxanes and recurring structural units from the series comprising aliphatic polyesters and polyether-esters.

Moulding materials of cellulose acetate cannot be processed as thermoplastics without the addition of plasticizers, since these esters start to decompose before softening. With cellulose acetopropionates and acetobutyrates, the softening and decomposition points are also so close to one another that these moulding materials also have to be mixed with plasticizers before thermoplastic processing. The necessary reduction in the processing temperature and processing viscosity is thus achieved.

Plasticizers which are used for organic cellulose esters are chiefly aliphatic esters of phthalic acid, adipic acid, azelaic acid, sebacic acid and phosphoric acid, such as, for example, dimethyl phthalates, diethyl phthalate, dibutyl adipate, dioctyl adipate, dibutyl acetate, trichloroethyl phosphate and tributyl phosphate. It is also frequently advantageous to employ mixtures of plasticizers.

Although the cellulose ester moulding materials modified with such plasticizers have useful properties, for some intended uses it it desirable to have available moulding materials with a high impact strength, especially at low temperatures, and at the same time with a high heat distortion point.

The invention relates to thermoplastic moulding materials of
(1) 70 to 99.9% by weight, preferably 75 to 99% by weight, of a cellulose ester or cellulose mixed ester,
(2) 0.1 to 30% by weight, preferably 0.25 to 25% by weight, of a rubber polymer built up in the form of blocks from recurring structural units (I) with molecular weights of 10,000 to 1,000,000, preferably 10,000 to 50,000 and from 100,000 to 500,000

   I wherein
A denotes bifunctional polysiloxane segments of the formula

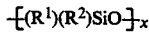   II in which
$R^1$ and $R^2$=aryl (in particular phenyl) or alkyl (in particular methyl) and
x is a number such that the molecular weight is $\Delta 500$, and
B denotes bifunctional aliphatic polyester and/or aliphatic polyester segments with molecular weights of $\geq 800$,
and the glass transition temperatures of the polymeric blocks A and B are below 20° C., preferably below −10° C., which contains additionally
(3) 0 to 30% by weight, preferably 2 to 25% by weight, based on the mixtures of (1) and (2), of a plasticizer. Preferred are mixtures of 70 to 99.9% by weight of (1), 0.1 to 5% by weight (2) and 0 to 30% by weight of (3) (each based on the total mixture), over the percentage figures must add up to 100 and most preferred are mixtures of 75 to 99% of (1); 0.25 to 3% by weight (2) and 2 to 25% by weight (3) (each based on the total mixtures) where the percentage figures must add up to 100.

Suitable cellulose esters (1) for the preparation of the moulding materials according to the invention are cellulose esters of aliphatic carboxylic acids with 1 to 5 C atoms, preferably cellulose acetate, acetopropionate and acetobutyrate.

Processes for the preparation of organic cellulose esters have been known for a long time and are described, for example, in Ullmanns Encyklopädie der technischen Chemie (Ullmanns Encyclopaedia of Industrial Chemistry) (Verlag Urban u. Schwarzenberg, Munich-Berlin, 1963) in Volume 5 on pages 182 to 201.

Preferred cellulose acetobutyrates contain 40 to 50% by weight of butyric acid groups and 15 to 26 by weight of acetic acid groups.

Cellulose acetobutyrates which are particularly preferably suitable for the moulding materials according to the invention are those with the following composition: 42 to 46% by weight of butyric acid groups and 18 to 22% by weight of acetic acid groups.

Preferred cellulose acetopropionates in general contain 50 to 66% by weight of propionic acid groups and 1 to 12% by weight of acetic acid groups, and particularly preferred cellulose acetopropionates have the following composition: 54 to 60% by weight of propionic acid groups and 4 to 9% by weight of acetic acid groups.

Of the cellulose acetates, secondary cellulose acetates are preferably employed.

The relative viscosities ($\eta_{rel}$) of 2% strength by weight solutions of the aliphatic cellulose esters used are, in acetone at 20° C., between 2.5 and 6.0, preferably between 3.5 and 5.0.

Block copolymers of bifunctional polysiloxane segments (A) and bifunctional aliphatic polyester and/or aliphatic polyether segments (B) are employed as the rubber polymers built up in the form of blocks (2).

The polysiloxane-blocks (A) contained in the block copolymers are polydialkyl-, polydiaryl- or polyarylalkylsiloxanes, in particular polydimethylsiloxane or polymethylphenylsiloxane radicals. They have block molecular weights of 500 to 20,000, in particular, 1,000 to 6,000; they are essentially linear.

The polyester segments which form the blocks B are derived from aliphatic saturated or unsaturated dicarboxylic acids, for example from oxalic acid, succinic acid, adipic acid, azelaic acid, sebacic acid, carbonic acid, maleic acid, fumaric acid or butadienedicarboxylic acid as well as from higher aliphatic dicarboxylic acids with more than 10 carbon atoms in the molecule. Particularly suitable diol components of the polyesters are ethanediol, butanediol, hexanediol, neopentylglycol, alkylene ether diols with molecular weights of up to 150 and unsaturated aliphatic diols, such as butenediols, and higher unsaturated diols with more than 10 C atoms in the molecule. Suitable blocks B are also polyether-diol radicals from the series comprising polyalkylene ethers, for example polyformaldehyde radicals, polytetrahydrofuran radicals, polyethylene oxide radicals, polybutylene oxide radicals and copolymers thereof.

Not only polyester or only polyether blocks can be present as component B in the block copolymers of units of the formula

—A—B—

It is also possible for one portion of the blocks B to be polyesters and the other portion polyethers, and finally blocks B which contain ether and esters functions side by side by side can also be present. If branched polyesters, polyethers or polysiloxanes are employed for the preparation of the block copolymers, in addition to linear polymers, block copolymers which have branched but non-crosslinked structures are obtained.

Polyether or polyester blocks which themselves have a sequence or block structure are also suitable as component B, for example polyethylene oxide-polypropylene oxide block copolymers and polyester-polyether block co-polymers.

Suitable block copolymers are likewise aliphatic polymers which contain the groupings —A—B—; such products are, for example, reaction products of polyetheror polyester-diols and bisacylpolysiloxanes in combination with polysiloxane diols. Polymers containing larger or smaller amounts of polysiloxane and any desired incorporated amount of grouping —A—B— are thereby obtained.

The block copolymers can be prepared by subjecting bis-acylated polysiloxanes to a polycondensation reaction with diols from the series comprising polyesters and polyethers. The starting components are usually employed in equimolar amounts; however, it may be advantageous to employ one or other of the components in a small excess. The final molecular weight can then be controlled better and the nature of the end groups can be determined. In order for the molecular weight to be determined even during the synthesis, molecular weight regulators, for example monofunctional compounds, such as monoalcohols, monoacylated polysiloxanes, anhydrides, esters and acid chlorides, can be used.

The synthesis of the block copolymers can be carried out at temperatures from 40° to about 200° C., in particular at 80° to 150° C. The reaction can be carried out without or with solvents, for example with aromatic hydrocarbons, paraffins, chlorinated hydrocarbons, liquid amides, esters, ketones and ethers.

Catalysts and/or acid-binding agents are preferably used, and, for example, organic or inorganic bases, such as salts (carbonates of alkali or alkaline earth metals) or soluble organic bases, such as tertiary amines, and also phase transfer catalysts, phosphines and Lewis bases are suitable. Under certain circumstances, at certain reaction temperatures, it is also advantageous to carry out the reaction in the presence of catalytic amounts of strong acids, especially if the polycondensation is carried out with the acids formed being distilled off.

The compounds usually employed in cellulose esters are used as plasticizers. Examples of suitable plasticizers are dimethyl phthalate, diethyl phthalate, diethyl phthalate, triphenyl phosphate, methyl ethylene glycol phthalate, di-n-butyl sebacate, ethyl butylene glycol phthalate, butyl butylene glycol phthalate, butyl benzyl phthalate and triacetin.

The moulding compositions according to the invention can also contain additives, for example in order to colour or pigment the polymer mixtures, to improve their stability towards oxidation or light or to reduce their flammability.

The moulding materials according to the invention based on organic cellulose esters and polysiloxane-containing rubber polymers built up in block form exhibit a remarkable increase in the notched impact strength measured according to DIN No. 53 453, while retaining the heat distortion point, which can be measured, for example, as the Vicat softening point according to DIN No. 53 460.

A particular embodiment of the invention is homogenization of the components of the mixture on single-or multi-screw mixing extruders with a subsequent granulating device. It should be ensured that the extruder screws are designed so that good mechanical mixing is achieved. It is also possible to produce finished articles directly, such as films, strands or injection-moulded articles, by this procedure.

The modified cellulose esters according to the invention can also be prepared by dissolving the component of the mixture in suitable solvents or solvent mixtures and then evaporating off the solvents. The evaporation of the solvent can either be effected by casting a film and evaporating off the volatile solvents under normal pressure or in vacuo at temperatures of 20° C. to 220° C. or by evaporation by means of devotalizing extruders.

Examples of suitable solvents which may be mentioned are: ketones, such as acetone, methyl ethyl ketone, cyclohexanone or diethyl ketone, esters, such as methyl acetate, ethyl or butyl acetate or methyl formate, ethers, such as diethyl ether, methyl, ethyl, propyl or butyl ethers of ethylene glycol or of diethylene glycol or tetrahydrofuran, amides, such as dimethylformamide or diethylformamide, chlorinated hydrocarbons, such as methylene chloride, chloroform, carbon tetrachloride, dichloroethane or dichloroethylene, or substituted or unsubstituted aromatic solvents, such as benzene, toluene, xylene, chlorobenzene, dichlorobenzene, nitrobenzene, anisole, phenol or cresol.

The moulding materials according to the invention can be processed by the normal methods of plastics processing, for example by injection moulding, extrusion or blowing of hollow bodies. They exhibit good flow properties here.

EXAMPLES

Example 1

Preparation of polysiloxane-containing rubber polymer built up in block form 1,000 parts by weight of a polytetrahydrofurandiol with a molecular weight of 2,000 (determined from the OH number), 2,000 parts by weight of an $\alpha,\omega$-bis-actylated polydimethylsiloxane with a molecular weight of 4,000 (determined by acetyl determination), 220 parts by weight of $Na_2CO_3$ and 3,000 parts by weight of chlorobenzene are reacted at 140° C. for 3 hours. Thereafter, the temperature is increased to 160 to 180° C., with an increasing viscosity of the solution. After a total reaction time of 7 hours, the mixture is cooled and filtered and the solvent is evaporated off. The resulting product is a rubber with a Staudinger index of 1.1 dl/g (in tetrahydrofuran).

Example 2

89.5 parts by weight of a cellulose acetopropionate with about 58% of propionic acid groups and about 5% of acetic acid groups and a relative viscosity ($\eta_{rel}$) of 4.2 (2% strength by weight solution in acetone at 20° C.), 0.5 part by weight of the block copolymer from Example 1, 8 parts by weight of dibutyl adipate and 2 parts by weight of dioctyl adipate are mixed and granulated in a twin-screw extruder at 200° C. to 220° C. The granules are then injection-moulded to test specimens on an injection moulding machine at a material temperature of 240° C.

The notched impact strength (according to DIN No. 53 453) had a value of 6.6 kJ/m², and on testing the impact strength at −40° C. (DIN No. 53 453), 25% of the test specimens are broken, and the Vicat B softening point (according to DIn No. 53 460) was 84° C.

Example 3

(Comparison)

90 parts by weight of the cellulose acetopropionate employed in Example 2, 8 parts by weight of dibutyl adipate and 2 parts by weight of dioctyl adipate are mixed, granulated and injection-moulded to test specimens as described in Example 2.

The notched impact strength (according to DIN No. 53 453) is 3.4 kJ/m², on testing of the impact strength at −40° C. (DIN No. 53 453) 65% of the test specimens are broken, and the Vicat B softening point (DIN No. 53 460) is 83° C.

We claim:

1. Thermoplastic moulding materials consisting of
   (1) 70 to 99.9% by weight of a cellulose ester or cellulose mixed ester
   (2) 0.1 to 30% by weight of a rubber polymer built up in the form of blocks from recurring structural units (I) with molecular weights of 10,000 to 1,000,000

$$\{A\text{—}B\} \qquad \qquad I$$

wherein

A denotes bifunctional polysiloxane segments of the formula $$\{(R^1)(R^2)SiO\}_x \qquad \qquad II$$

in which
   $R^1$ and $R^2$ = aryl (in particular phenyl) or alkyl (in particular methyl) and
   x is a number such that the molecular weight is $\geq 500$, and
   B denotes bifunctional aliphatic polyester and/or aliphatic polyester segments with molecular weights of $\geq 800$,
   and the glass transition temperatures of the polymeric blocks A and B are less than 20° C., which contain additionally
   (3) 0 to 30% by weight based on the mixture of (1) and (2) of a plasticizer.

2. Thermoplastic moulding materials according to claim 1 containing
   (1) 70 to 99% by weight of component (1)
   (2) 0.1 to 5% by weight of component (2)
   (3) 0 to 30% by weight of component (3) (each based on total mixture)
   where the percentage figures are up to 100.

3. Thermoplastic moulding materials according to claim 1, consisting of (1) 75 to 99% by weight of component (1), (2) 0.25 to 3% by weight of component (2) and (3) 2 to 25% by weight of component (3), each based on the total mixtures and in which the percentage figures add up to 100.

4. Thermoplastic moulding materials according to claim 1 containing cellulose acetobutyrate, cellulose acetobutyrate, cellulose acetopropionate, cellulose acetate or mixtures thereof as component (1).

* * * * *